United States Patent [19]

Öhrle et al.

[11] Patent Number: 4,805,959
[45] Date of Patent: Feb. 21, 1989

[54] VEHICLE SLIDING ROOF SEALING ARRANGEMENT

[75] Inventors: Rolf Öhrle, Herrenberg; Werner Herlemann, Aidlingen; Jochen Pärisch, Herrenberg, all of Fed. Rep. of Germany

[73] Assignee: Daimler-Benz Aktiengesellschaft, Stuttgart, Fed. Rep. of Germany

[21] Appl. No.: 105,532

[22] Filed: Oct. 7, 1987

[30] Foreign Application Priority Data

Oct. 8, 1986 [DE] Fed. Rep. of Germany ....... 3634271

[51] Int. Cl.$^4$ .................. B60J 7/043; B60J 7/053; F16J 9/00; E06B 7/16
[52] U.S. Cl. ..................... 296/216; 49/482; 49/493; 81/484; 81/485; 277/12; 296/222
[58] Field of Search ............... 296/216, 222; 49/482, 49/493, 452; 277/12, 189, 207 R, 182; 81/484, 485, 488

[56] References Cited

U.S. PATENT DOCUMENTS 3,174,793 3/1965 Nallinger et al. .................. 296/222
4,667,966 5/1987 Oemrle et al. .................. 296/216 X

FOREIGN PATENT DOCUMENTS 3442653 11/1984 Fed. Rep. of Germany .
3420614 12/1985 Fed. Rep. of Germany ...... 296/216
0470684 8/1937 United Kingdom ................. 49/482

Primary Examiner—Andres Kashnikow
Assistant Examiner—Robert J. Oberleitner
Attorney, Agent, or Firm—Barnes & Thornburg

[57] ABSTRACT

The cover of a rigid sliding roof is sealed against the solid roof region around it by means of a peripheral hollow chamber seal, a bead of this seal being only locally in contact with protrusions which are formed at the front of a rail fixing the hollow chamber seal. So that an adjustment procedure can be carried out in the case of a lack of pressure effect or in the case of too much pressure effect by means of tools, one appropriate to each case, each protrusion is aligned with and at a distance from a penetration which can be plastically deformed so that in each case the protrusion is moved towards or away from the penetration.

4 Claims, 2 Drawing Sheets

VEHICLE SLIDING ROOF SEALING ARRANGEMENT

BACKGROUND AND SUMMARY OF THE INVENTION

The invention concerns a seal, for the gap between a rigid sliding roof and a motor vehicle solid roof region surrounding it. A peripheral hollow chamber seal is accepted by a rail fixed to the roof underneath the solid roof region. The hollow chamber seal has a bead associated with the front of the rail, which bead is only locally in contact with protrusions formed at the front surface of the rail.

An arrangement of this general type is known from German Patent DE-PS No. 34 42 653 and covers a wide tolerance field. However, in practice it has been found that statistical exceptions continually appear in which, in particular, an excessive pressure effect occurs only locally or there is a narrow gap which causes excessively disturbing aerodynamic noises. Such limiting cases cannot be dealt with using the previously known seal arrangement.

An objective of the invention is to provide a possibility, on the basis of a modification of the known seal arrangement, by means of which even sealing problems beyond those usually occurring can be appropriately brought under control in a simple manner.

This objective is achieved by aligning each protrusion at a distance from a penetration or aperture whose width can be changed by means of a tool in such a way that the protrusion is moved towards or away from the penetration. If an excessive pressure effect occurs—which can lead to overload on the electric motor in the case of an electrical motor driven sliding roof—the protrusions in the corresponding area are pressed in the direction of the aligned penetrations whereas, in the case of insufficient sealing effect, the protrusions are levered away from the associated penetrations by the use of a tool in these penetrations.

Other objects, advantages and novel features of the present invention will become apparent from the following detailed description of the invention when considered in conjunction with the accompanying drawings.

DETAILED DESCRIPTION OF THE DRAWINGS

Figure 1:
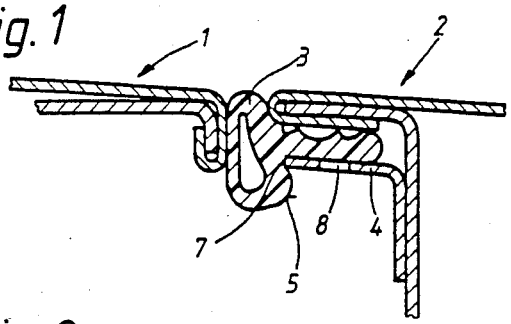
FIG. 1 is a schematic sectional view of a hollow chamber seal and rail with penetrations constructed in accordance with a preferred embodiment of the present invention, depicted under conditions of a correct pressing effect.

A rigid sliding roof 1 is sealed against the roof region 2 surrounding it by a peripheral hollow chamber seal 3 which is securely held on the underside of the roof region 2 by a metal rail 4. A bead 5, which is locally in contact with protrusions 7 formed on the front 6 of the rail 4, is formed on the hollow chamber seal 3.

Figure 2:
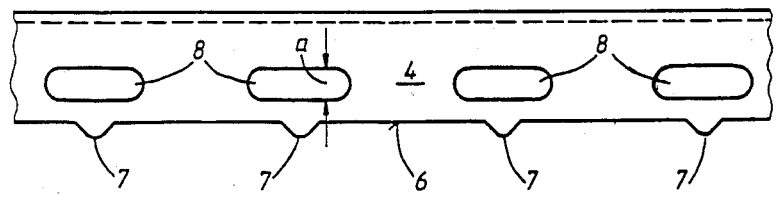
FIG. 2 is a top view of the rail of the FIG. 1 embodiment, depicted in an undeformed state.

Each protrusion 7 is aligned with and at a distance from a penetration 8 having a width "a", the penetration being designed, in the undeformed shown in FIG. 2, as an elongated hole. This original elongated hole shape is retained when a predetermined pressing effect of the hollow chamber seal 3 is achieved on all sides of the sliding roof 1, the seal 3 then assuming the shape shown in FIG. 1.

Figure 3:
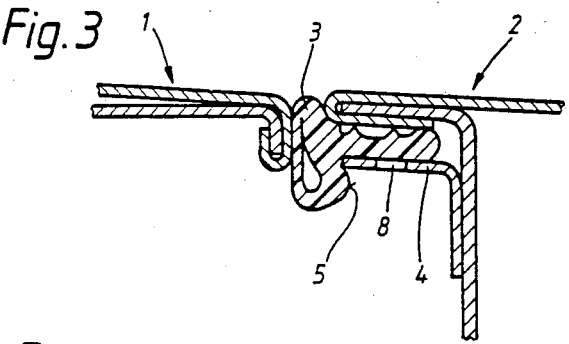
FIGS. 3 and 4 are views similar to the respective views of FIGS. 1 and 2, but showing measures taken at the rail penetrations in the case of excessive pressure effect.
Figure 4:
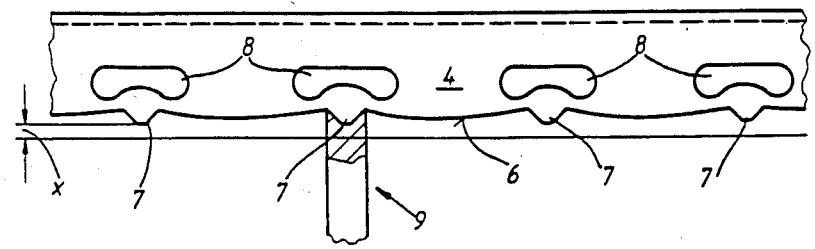

If, on the other hand, the pressure effect is too large, which can also occur only locally, the hollow chamber seal 3 is greatly deformed—as shown in FIG. 3. In such a case, the tool 9 sketched in FIG. 4 is used and, by means of it, the bead 5 is first pressed up with the sliding roof 1 open, the tool then being placed on the particular protrusion 7. By means of measured hammer blows on the tool 9, the protrusion 7 is moved by a desired amount "x" towards the penetration 8 aligned with it so that the latter is in each case pressed in to form a kidney shape.

Figure 5:
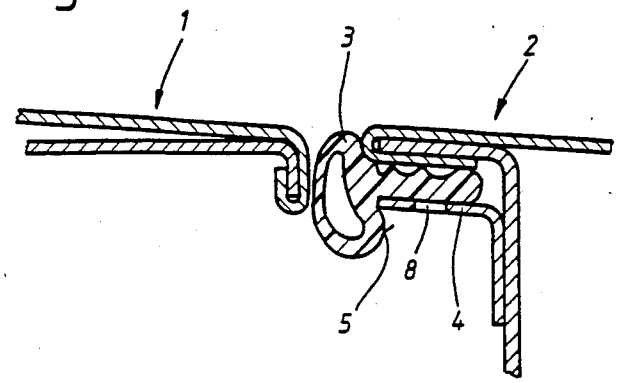
FIGS. 5 and 6 are views similar to respective views of FIGS. 1 and 2, but showing measures taken at the rail penetrations in the case of a lack of pressure effect.
Figure 6:
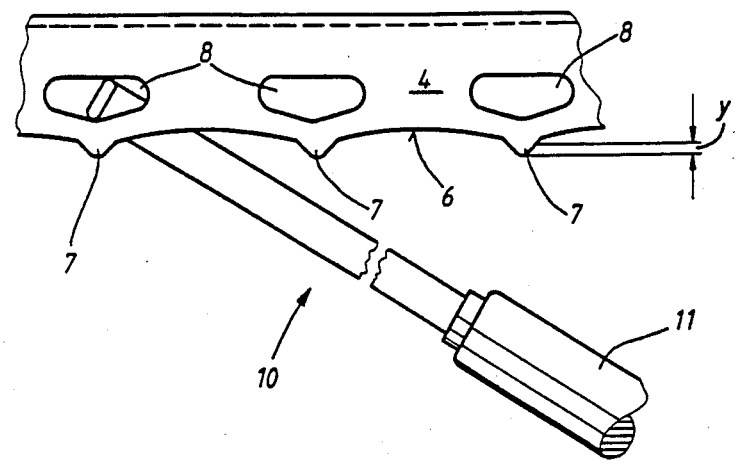

If an insufficient pressure effect occurs or if—as shown in FIG. 5—a gap is formed between the sliding roof 1 and the hollow chamber seal 3, the tool 10 indicated in FIG. 6 is introduced into the appropriate penetration 8. The handle 11 of the tool 10 is initially located approximately at right angles to the rail 4 and is then pivoted to the side to carry out an adjustment procedure. This procedure causes local widening and hence an increase in the width of the particular penetration 8, which leads to a forward displacement of the associated protrusion 7 by an amount "y".

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Seal, for the gap between a rigid sliding roof and a motor vehicle solid roof region surrounding it, comprising a peripheral hollow chamber seal which is accepted, underneath the solid roof region, by a rail fixed adjacent to the solid roof region, the hollow chamber seal having a bead associated with the front of the rail, which bead is only locally in contact with a plurality of protrusions formed on the front of the rail, wherein each protrusion is aligned with and at a distance from a penetration whose width can be increased or decreased by means of a tool in such a way that each protrusion is moved towards or away from the penetration whose width is decreased or increased.

2. Sealing arrangement for sealing the gap between a rigid sliding roof and a motor vehicle solid roof region surrounding the sliding roof, comprising:
   a peripheral hollow chamber seal having a sealing surface at one side thereof which operably, sealingly engages the rigid sliding roof when in an in use position in a motor vehicle, and
   a seal support rail fixedly attachable to the motor vehicle solid roof region adjacent a roof opening within which the sliding roof is to be located, said seal support rail including a plurality of protrusions at one side thereof which are abuttingly engagable against the seal at a side of the seal facing away from the sealing surface, wherein said seal support rail includes adjusting apertures aligned with the respective protrusions, said adjusting apertures being configured to accommodate plastic deformation changes in the adjusting aperture shape in response to tool forces acting on at least one of the protrusions and the aperture wall surfaces to thereby effectively change the position of the protrusion to locally adjust the sealing pressure force of the seal against the sliding roof.

3. Sealing arrangement according to claim 2, wherein said adjusting apertures are elongated holes with their long sides aligned with respective area of said protrusions.

4. Sealing arrangement according to claim 3, wherein said seal includes a support section clampingly held between the seal support rail and adjacent the motor vehicle solid roof region.

* * * * *